Dec. 21, 1965    H. E. CANN III    3,224,460
MILK TRANSFER SYSTEM
Filed Jan. 9, 1963
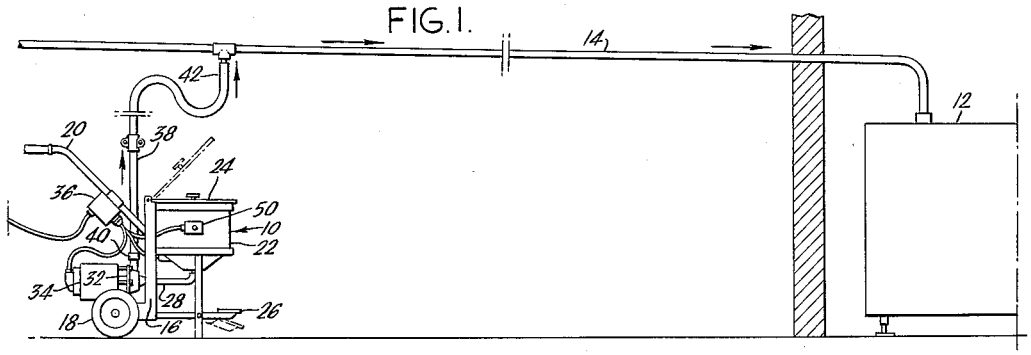
FIG. 1.
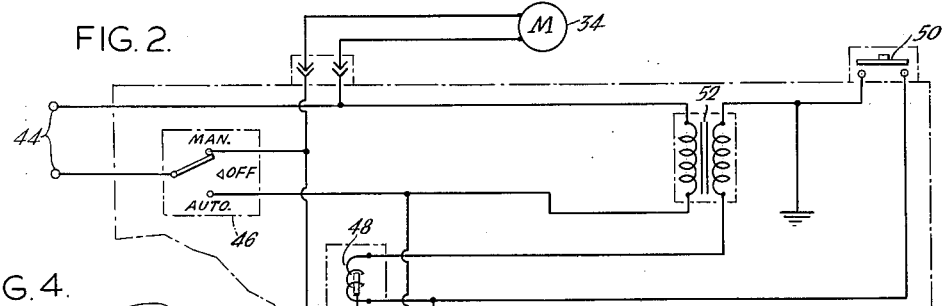
FIG. 2.
FIG. 4.
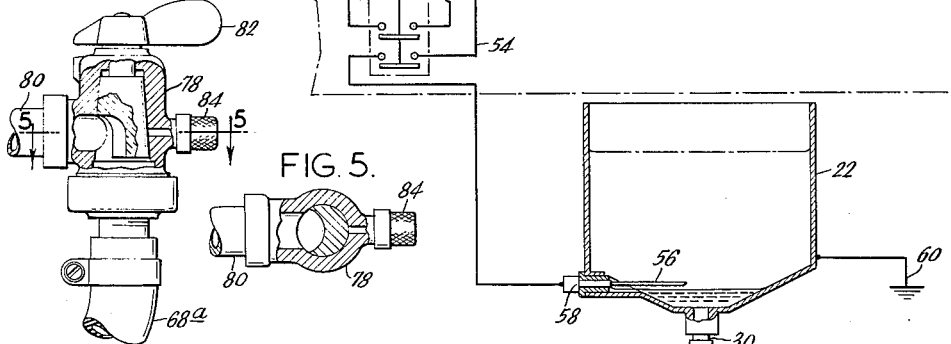
FIG. 5.
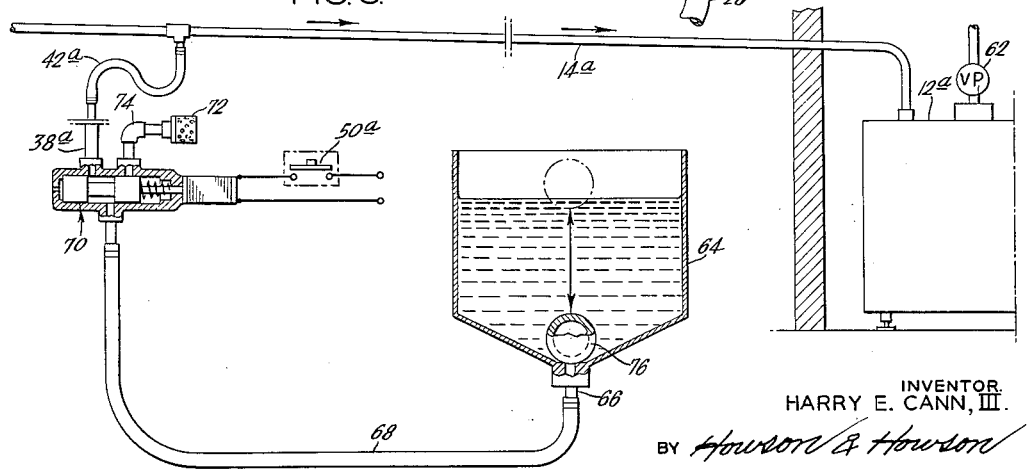
FIG. 3.
INVENTOR.
HARRY E. CANN, III.
BY Howson & Howson
ATTYS.

United States Patent Office 3,224,460
Patented Dec. 21, 1965

3,224,460
MILK TRANSFER SYSTEM
Harry E. Cann III, West Chester, Pa., assignor to Esco Cabinet Company, West Chester, Pa., a corporation of Pennsylvania
Filed Jan. 9, 1963, Ser. No. 250,436
3 Claims. (Cl. 137—399)

The present invention relates generally to milk transfer systems for use in transferring milk from barn areas to bulk cooling tanks and more particularly to a system which permits a positive transfer control and includes means for isolating pure milk from the bulk cooler should impurities be observed therein.

In large dairies it is customary to accumulate milk in centrally located bulk cooling units following collection. The milk is generally transferred from the collecting containers into an intermediate transfer container which includes a filtering means and from which it is automatically pumped or drawn by vacuum into a bulk cooler. In some installations the intermediate container or transfer unit is situated adjacent the bulk cooler, while in others it is remotely located and of a portable type such that milk may be transferred thereto in the barn and passed through conduits into the bulk cooler.

Prior to the present development, there has existed the danger that an impure batch of milk when transferred to the intermediate container would be automatically pumped, or transferred by vacuum, into the bulk cooler thereby affecting the purity of a large volume of milk. Since in most instances foreign matter cannot be detected until the milk is poured into the transfer unit, it can be understood that in such a system even with diligent prior inspection of the contents of the milking containers, impure matter is liable to pass into the bulk cooler.

It is accordingly a first object of the present invention to provide a milk transfer system having control means permitting transfer of milk to a subsequent container only upon manual actuation of the control means.

A further object of the invention is to provide a system as described which may be readily drained upon discovery of impure matter therein without permitting air or impurities to enter into the bulk container system.

An additional object of the invention is to provide a system as described the elements of which may be easily disassembled for cleaning and maintenance purposes.

Still another object of the invention is to provide a system as described which maintains a fluid level in the transfer system to prevent air entry into the bulk cooler.

Additional objects and advantages of the invention will be more readily apparent from the following detailed description of embodiments thereof when taken together with the accompanying drawings in which:

FIG. 1 is an elevational view of a system in accordance with the present invention in which a pump type transfer unit is shown remotely situated from a bulk cooler and connected thereto by an overhead conduit;

FIG. 2 is a sectional view of the transfer unit container of the embodiment of FIG. 1 shown in conjunction with a schematic wiring diagram indicating a preferred control circuit;

FIG. 3 is an elevational view of a modified embodiment of the invention in which the transfer unit is connected with a vacuum line leading into the bulk cooler;

FIG. 4 is a modified embodiment of the valve control of the FIG. 3 embodiment; and FIG. 5 is a sectional view taken along line 5—5 of FIG. 4.

Referring to the drawings and particularly to FIG. 1 thereof, a portable transfer unit 10 embodying the present invention is shown remotely located from a bulk cooler 12 connected therewith by conduit 14. The portable transfer unit includes a frame 16 movable on wheels 18 by means of handle 20. Mounted on the frame at a convenient height is a milk-receiving tank 22 having a hinged lid 24 operable by depression of treadle 26.

A transparent plastic connector tube 28 is friction fitted over outlet pipe 30 of the tank 22 as shown more clearly in FIG. 2. The connector tube leads into pump 32 adapted to be driven by motor 34. The motor is controlled by the circuit of FIG. 2 described in detail below.

The fluid outlet of the pump is connected with a vertical strainer tube 38 at the lower end of which is incorporated a flapper valve 40. A flexible transparent plastic transfer tube 42 is adapted for attachment to the overhead conduit 14 leading into the bulk cooler 12.

Referring to the control circuit shown in FIG. 2, a power supply 44 is connected with the motor 34 by a circuit which includes a three-way toggle switch 46 located on control box 36 for setting the circuit for automatic or manual operation. The setting of the switch for manual control as is shown in FIG. 2 provides a continuous running of the motor and pump until it is shut off.

Setting of the switch 46 to the automatic position provides a motor circuit including solenoid operated spring-opened relay 48 controlled by push button switch 50 located on the side of the tank 22. Transformer 52 provides a control circuit for the switch 50. Connected in parallel with the switch 50 is line 54 passing through a second set of contacts on the relay 48 and connected with a probe 56 projecting into tank 22 near the bottom thereof and insulated therefrom by insulated bushing 58. The tank 22 is grounded as indicated at 60.

For normal operation, the selector switch 46 is set to the automatic position. The treadle 26 is depressed opening the lid 24 and milk from a milking container is poured into the milk-receiving tank 22. During pouring, the milk is examined for impurities. Should the milk be found suitable for transfer to the bulk cooler, the push button switch 50 on the side of the tank is depressed, thereby closing the contacts of solenoid relay 48 energizing the pump motor. A current from the transformer 52 passes through the relay, line 54, probe 56, the milk in the tank, and ground 60. A current is thus provided through the immersed probe to hold the relay 48 closed despite opening of the switch 50 upon release thereof.

When the milk level in the tank 22 drops below the probe 56, the circuit through line 54 is broken and the relay 48 opens thereby opening the motor circuit and stopping the pump. The motor cannot be restarted by subsequent immersion of the probe until the push button 50 is closed since the opening of the relay 48 breaks the circuit through the line 54 as well as the motor circuit.

The automatic setting of the switch 46 thus provides an arrangement whereby a volume of milk may be poured into the tank 22 without danger of contaminating milk in the bulk cooler should the poured milk prove upon inspection to be contaminated. Should the purity of the milk in the tank be questioned, the connector tube 28 is simply pulled from the outlet pipe 30 and the contents of the tank are drained from the unit along with milk in the connector tube, pump, and strainer tube below the flapper valve 40. Should the milk be satisfactory, upon closing of the push button switch, the milk in the tank is pumped into the bulk cooler until the milk level falls below the probe 56. The pump then automatically stops until additional milk is introduced into the tank and the push button switch depressed to begin a new pumping cycle. This arrangement by maintaining at all times a fluid level in the bottom of the tank prevents the entry of air and foreign matter into the pump and conduit system which might affect the purity of the milk.

With the selector switch 46 in the manual position, the probe is inoperative and the pump continues to operate until the switch 46 is shut off. This setting of the switch would be used for example at the end of the milking run to exhaust as much milk as possible from the system prior to disassembly and cleaning thereof. This arrangement is also adapted for washing out the tank and the overall system.

FIG. 3 illustrates a modified embodiment of the invention for use with systems in which the bulk cooling tank is maintained at a pressure less than atmospheric. A vacuum pump 62 is shown connected with a bulk cooler 12a into which milk flows due to the vacuum pressure through vacuum conduit 14a. Mounted on a portable frame (not shown), such as that illustrated in FIG. 1, is a milk-receiving tank 64 having an outlet pipe 66. A transparent flexible plastic connector tube 68 is attached to the outlet pipe 66 to provide a fluid passage from the tank to a spool valve 70. A buoyant ball 76 is included in the tank 64 of a size adapted to seat on the upper opening of the outlet pipe 66 to effect a fluid-tight closure thereof.

The valve 70 is of a spring-loaded solenoid controlled spool type with the solenoid actuated by a push button switch 50a, preferably located on the side of the tank 64. In the normal position of the valve 70 with the switch 50a open, the spring-biased spools provides a fluid passage through the valve from the connector tube 68 into a strainer tube 38a and transfer tube 42a which is connected to the vacuum line 14a. Upon closing of the push button switch 50a, the spool of the valve 70 is moved to the right to permit air at atmospheric pressure to enter the connector tube 68, the air entering the valve through a filter 72 and conduit 74.

In operation, the modified embodiment is connected as shown to a vacuum line 14a. With the pressure in the connector tube 68 below atmospheric pressure, the ball 76 is held by the pressure differential over the outlet pipe 66 to prevent fluid flow into the vacuum system. While milk is introduced into the tank 64 and inspected for impurities, the ball as shown in FIG. 3 is held by the vacuum in position preventing milk flow from the tank.

Upon determination that the milk is suitable for transfer to the bulk cooler, the push button switch 50a is depressed moving the spool of the valve 70 to the right and admitting air at atmospheric pressure into the connector tube 68. The switch 50a need only be depressed momentarily to permit a sufficient amount of air to enter the connector tube 68 so as to release the vacuum on the ball 76 and due to its buoyancy, free the ball from the outlet pipe. The ball then rises and floats on the surface of the milk. On release of the switch 50 the vacuum system acts to transfer the milk into the bulk cooler. When the milk level reaches the bottom of the tank 64, the ball 76 again is seated upon the outlet pipe and the vacuum within the tube 68 holds the ball in place to seal the tube from entry of air or other matter. Thus, as was the case with the embodiment of FIGS. 1 and 2, the push button switch must be actuated before a further volume of milk can be transferred into the bulk cooler. Protection is thus provided against the possibility of impure milk being inadvertently introduced into the bulk cooler milk supply. Should impurities be discovered in milk in the tank 64, the switch 50a is depressed to close the vacuum system above the valve 70, and the connector tube 68 is detached from the outlet pipe 66 and drained along with the contents of the tank.

The valve 70 and particularly the air conduit 74 thereof should be located above the highest fluid level of the tank 64 to prevent milk from passing out through the air inlet in the event that the push button switch 50a is depressed for a longer period than necessary.

A modification of the embodiment of FIG. 3 is shown in FIGS. 4 and 5 in which a manually operated plug valve 78 is used in place of the spool valve 70. The connector tube 68a from the tank is connected with the lower end of the plug valve and, in the position of the valve shown in FIGS. 4 and 5, a fluid passage is provided from the connector tube into the conduit 80 leading to a strainer tube and the bulk cooler vacuum conduit.

Rotation of the valve plug by means of valve lever 82 closes the passage into the conduit 80 and permits air to enter into the connector tube 68a through air filter 84. The valve functions in a manner similar to that of the spool valve 70, the operation of which is set forth above. The lever 82 is turned and quickly returned to provide the air entry necessary to free the ball from the outlet pipe.

The relationship in size between the buoyant ball and the outlet pipe opening should be chosen so that the surfaces on which the differential pressures are acting to secure the ball are sufficient to prevent a rocking of the ball off of the outlet pipe opening upon introduction of milk into the tank. For example, in a system utilizing 11–13 inches of vacuum, a four inch ball used with a one inch outlet pipe would provide the desired stability while having sufficient buoyancy to permit opening of the outlet pipe with a minimum amount of air being introduced into the system through the filter valve inlet.

Minor changes in details of construction can be effected by those skilled in the art without departing from the spirit and scope of the invention as defined in and limited solely by the appended claims.

I claim:

1. A milk transfer unit comprising a milk-receiving tank, an outlet pipe at the bottom of said tank, a buoyant ball adapted to seat over said outlet pipe, a two-way valve, a connector tube connecting said valve with said outlet pipe, a first outlet of said valve connected with a vacuum bulk container, a second outlet of said valve opening into the atmosphere, a valve control means for connecting said connector tube with either said first valve outlet or said second valve outlet, said buoyant ball seating on said outlet pipe when said connector tube is connected with said vacuum bulk container, said ball being adapted to be freed from said outlet pipe subsequent to introduction of milk into said tank by actuation of said valve to introduce air at atmospheric pressure into said connector tube, said ball being adapted to again seat upon said outlet pipe following passage of the milk introduced therein into the bulk container.

2. A milk transfer unit as claimed in claim 1 wherein said valve comprises a spring-loaded solenoid actuatable spool valve.

3. A milk transfer unit as claimed in claim 1, said valve comprising a manually actuatable plug valve.

References Cited by the Examiner

UNITED STATES PATENTS

| | | | |
|---|---|---|---|
| 2,790,629 | 4/1957 | McGovern et al. | 137—565 XR |
| 2,796,883 | 6/1957 | Thompson | 137—399 |
| 2,934,090 | 4/1960 | Kenann et al. | 251—129 |
| 3,088,483 | 5/1963 | Brunson | 137—565 XR |

FOREIGN PATENTS

| | | |
|---|---|---|
| 556,599 | 6/1942 | Great Britain. |
| 11,083 | 8/1902 | Norway. |

ISADOR WEIL, *Primary Examiner.*

LAVERNE D. GEIGER, WILLIAM F. O'DEA,
*Examiners.*